United States Patent [19]

Dennis et al.

[11] 4,323,000
[45] Apr. 6, 1982

[54] ARMOR FABRICATION

[75] Inventors: Dwight L. Dennis, China Lake, Calif.; William A. Mannschreck, Fredericksburg, Va.

[73] Assignee: The United States of America as represented by the Secretary of the Navy, Washington, D.C.

[21] Appl. No.: 806,021

[22] Filed: Jun. 9, 1977

[51] Int. Cl.³ .................................................. F41H 5/04
[52] U.S. Cl. ..................................... 89/36 A; 109/84; 428/911
[58] Field of Search ................... 89/36 A, 36 H, 36 Z; 109/82, 83, 84; 114/12, 14; 428/911, 912

[56] References Cited

U.S. PATENT DOCUMENTS

| | | | |
|---|---|---|---|
| 1,270,343 | 6/1918 | Szmyt | 89/36 A |
| 2,464,827 | 3/1949 | Noyes | 428/912 |
| 3,575,786 | 4/1971 | Baker et al. | 428/911 |
| 3,916,060 | 10/1975 | Fish et al. | 428/303 |

FOREIGN PATENT DOCUMENTS 114746  3/1942  Australia ............................. 428/912

Primary Examiner—Stephen C. Bentley
Attorney, Agent, or Firm—Robert F. Beers; W. Thom Skeer

[57] ABSTRACT

A lightweight armor system for defense against a high explosive incendiary projectile characterized by a lightweight armor trigger plate placed in front of and spaced from a relatively heavier main armor. The trigger plate may consist of a ceramic-fiberglass sandwich and the main armor a one half inch thickness of aluminum backed by a built-up layer of ballistic nylon webbing and sealed by a layer of rubber sheeting. The space between the trigger plate and the main armor may be filled with a material having flame suppressive characteristics to lessen the incendiary effect of the projectile.

16 Claims, 1 Drawing Figure

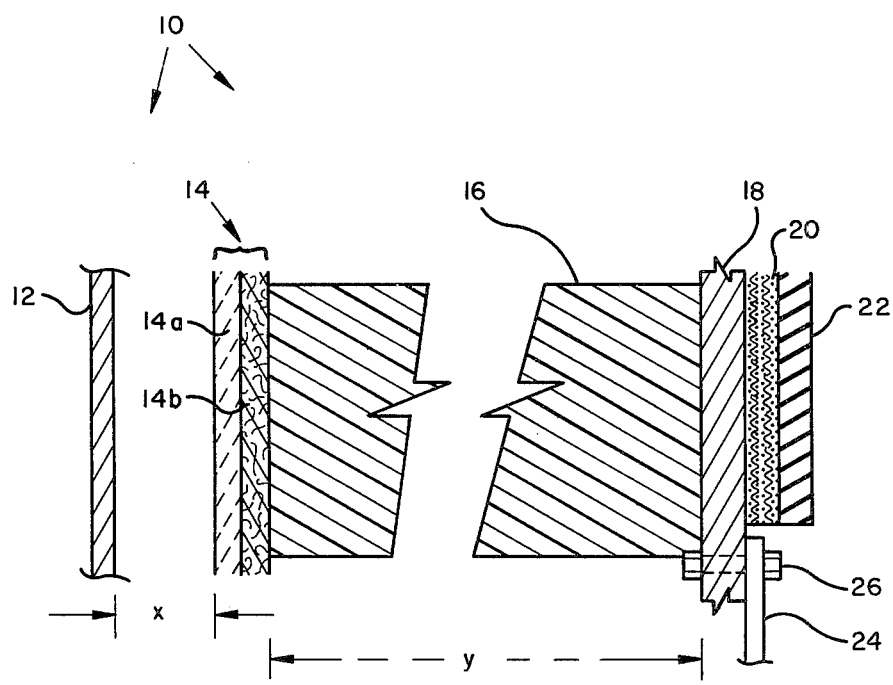

ARMOR FABRICATION

BACKGROUND OF THE INVENTION

This invention relates to protective armor and more particularly to a lightweight armor system for protection of vital areas of a vehicle, for example, from damage when the vehicle is struck by a high explosive incendiary (HEI) projectile.

In the past a variety of approaches have been taken to the problem of protective armor and including a "sandwich" of a mix of metals, non-metals and ceramics as illustrated in U.S. Pat. Nos. 3,633,520 and 3,804,034 issued Jan. 11, 1972 and Apr. 16, 1974 respectively to J. J. Stiglich, Jr.

In testing of prior designs for effectiveness against HEI projectiles, penetration of the armor was effected and a large fire ball was formed. In addition, prior armor structures tested were loosened from their fittings and impacted upon interior components of the target (an aircraft fuselage) in a damaging collision. High velocity fragments were not stopped.

In general, earlier designs were either ineffective, prohibitively bulky or excessively heavy.

SUMMARY OF THE INVENTION

A primary object of the present invention, therefore, is to provide a direct "hardened" vehicle assembly (particularly in the engine area of an aircraft) which can be struck by a 23 mm high explosive incendiary (HEI) projectile and not allow transfer of fragments, ignition of combustibles or penetration of interior components.

It is a further object of this invention to provide a lightweight protective armor system to protect the vital parts of a vehicle from catastrophic damage when struck by HEI projectiles having delay type contact fuzing. These HEI projectiles typically are fuzed to sense contact with a target and set to explode a few milliseconds after penetration of the target so that high-velocity fragments and incendiary materials are distributed within the target framework.

The protective armor system according to the present invention, which is designed to defeat the HEI projectile, involves a defense in depth concept wherein a trigger plate of lightweight ceramic armor is placed in front of a relatively heavier main armor plate and spaced therefrom. The inner surface of the main armor plate is backed by a ballistic webbing and sealed with a coating of rubber to seal out moisture or other liquid present. The space between the trigger plate armor and the main armor is preferably filled with a material having flame suppressive characteristics.

BRIEF DESCRIPTION OF THE DRAWING

The single FIGURE of the drawing is a diagrammatic view illustrating, in partial cross-section, an armor system according to the present invention.

DETAILED DESCRIPTION OF THE PREFERRED EMBODIMENTS

A defensive armor system in a typical installation according to the present invention is generally indicated at 10 on the drawing. The outer skin of a vehicle is generally indicated at 12.

In an aircraft, for example, this outer skin would normally be of about 0.063 inch aluminum. Spaced inwardly from the outer skin by a distance x is a composite armor element 14 which may consist, for example, of a ceramic-glass fiber composite. Armor element 14, for example, may consist of a boron carbide armor plate 14a covered by an inner layer of fiber matting 14b such as, for example, a polyester glass roving mat. Armor element 14 is typically about one-half inch thick.

Armor element 14 is separated from a main armor 18 by a space of distance y which may be filled with a fire retardant filler material 16. Main armor 18, which is a relatively thick metal plate, is backed by a tough, flexible fabric webbing 20 and sealed by a layer 22 of elastomeric material such as natural or synthetic rubber.

In a typical example, main armor 18 consists of a sheet of aluminum (AL-7039) one-half inch thick, webbing 20 is made up of a wrapping of ten layers of ballistic nylon, and layer 22 consists of one-quarter inch rubber sheeting. The armor system may be integrally assembled and attached to the frame of the vehicle by conventional brackets generally indicated at 24, fastened to the armor system by bolts, as indicated at 26. Filler material 16 in the example includes a polyurethane foam matrix prepared in accordance with the disclosure in assignee's prior U.S. Pat. No. 3,916,060 issued Oct. 28, 1975. Within the foam matrix the patent, there is an inorganic flame retardant material. When a projectile or particle passes through the matrix, the cells of the foam are broken, releasing the flame retardant material behind the projectile or particle, thus suppressing any fireball which might be caused by the projectile or particle.

The dimensions x and y may be varied as necessary within the confinement of the area to be protected. The distance x may range from near 0 to about 1 inch and the distance y from about 4 inches to about 8 inches. The optimum ratio of x to y is considered to be on the order of 1:8.

The armor system according to the present invention is considered as a "defense in depth" concept. In operation, the fuze of a high energy incendiary projectile, for example, should function upon striking the outer vehicle skin 12 and, since first armor 14 is spaced from outer skin 12, functioning of the projectile fuze should be completed within the region between skin 12 and first armor layer 14. First armor 14 will then retard the projectile.

If outer skin 12 does not cause function of the projectile fuze, then functioning of the fuze would be caused by armor 14. In that event, main armor plate 18 will deflect the projectile. Ballistic webbing layer 20 is designed as a final fragment retarder and inner layer 22 of elastomeric material provides a sealant to prevent fuel soak and deterioration of the armor.

In a test using a 23 mm high explosive projectile, an armor system according to the above description successfully withstood the impact, with complete suppression of the fireball. The armor deflected all fragments away from the protected area and a number of small fragments were trapped in the ballistic nylon wrap.

Although a specific embodiment of the invention has been described and illustrated, it will be understood that the armor components and filler material may, or may not, be bonded together as an assembly and the shape and orientation of the components and materials may be varied. Thus, the armor elements may be corrugated, waffled, or random and oriented in parallel opposition, angled or axial; the vehicle skin 12 and first armor 14 may be combined in one structure; and the substitution of other similar materials for any of the components may be resorted to without departing from the spirit of the invention.

What is claimed is:

1. A defensive armor system for protection of vital areas of a vehicle or other closed volume comprising:
   a first armor including a boron carbide layer and a polyester glass roving mat;
   a second armor spaced from said first armor and including an inner layer of elastomeric sheet rubber, an aluminum plate, and about ten layers of ballistic webbing; and
   urethane filler material located between said first and second armor.

2. A defensive armor system according to claim 1 wherein said first armor and said second armor are bonded to said urethane filler material to form a unitary assembly.

3. The armor system of claim 1 further including a fire suppressant within said urethane filler material.

4. The armor system of claim 1 wherein said vehicle or other closed volume comprises an outer skin and said first armor is spaced inwardly from the skin of the vehicle and the ratio of the distance between the vehicle skin and the first armor and the distance between the first and second armor is about 1:8.

5. The armor system of claim 1 wherein the distance between the first armor and an outer skin comprising said vehicle or other enclosed volume is between 0.01 and 1.0 inches and the distance between said first and second armor is between 4 inches to about 8 inches.

6. An armor system for protecting predetermined areas within an enclosure having a skin comprising:
   a first composite armor having a rigid surface facing outward and spaced inwardly from said skin by a predetermined skin separation distance;
   a metallic plate facing said first armor and separated inwardly therefrom by an armor separation distance;
   a urethane foam layer containing a fire retardant bonded to and extending between said first composite armor and said metallic plate and filling the armor separation distance therebetween and bonding said first composite armor and said metallic plate thereby forming a unitary solid assembly;
   a layer of webbing attached to said metallic plate on the side opposite said urethane foam layer and co-extensive therewith; and
   an elastomeric layer sealingly attached to and co-extensive with said layer of webbing on the side remote from said metallic plate.

7. An armor system according to claim 6 in which said first composite armor is a bilayer of a rigid ceramic material and a layer of glass fiber arranged with the ceramic layer nearer the skin of the enclosure.

8. An armor system according to claim 7 wherein said ceramic material is boron carbide.

9. An armor system according to claim 7 wherein said glass fiber layer is a polyester glass roving mat.

10. An armor system according to claim 6 wherein said predetermined skin separation distance is between 0.01 and 1.0 inch.

11. An armor system according to claim 6 wherein the ratio between said predetermined skin separation distance and said armor separation distance is approximately 1:8.

12. An armor system according to claim 10 wherein the ratio between said predetermined skin separation distance and said armor separation distance is approximately 1:8.

13. An armor system according to claim 6 in which said metallic plate is aluminum.

14. An armor system according to claim 6 further including:
   mounting means joined to said metallic plate for attaching said unitary assembly to a support within the enclosure so as to determine said skin separation distance.

15. An armor system according to claim 14 wherein said mounting means includes a bracket.

16. An armor system according to claim 6 wherein said layer of webbing includes a plurality of layers of ballistic nylon.

* * * * *